(12) United States Patent
Nicoll et al.

(10) Patent No.: US 7,736,760 B2
(45) Date of Patent: Jun. 15, 2010

(54) CERAMIC ABRADABLE MATERIAL WITH ALUMINA DOPANT

(75) Inventors: Andrew R. Nicoll, Wohlen (CH); Scott Wilson, Winterthur (CH)

(73) Assignee: Sulzer Metco (US), Inc., Westbury, NY (US)

( * ) Notice: Subject to any disclaimer, the term of this patent is extended or adjusted under 35 U.S.C. 154(b) by 952 days.

(21) Appl. No.: 11/453,874

(22) Filed: Jun. 16, 2006

(65) Prior Publication Data

US 2006/0285972 A1    Dec. 21, 2006

Related U.S. Application Data

(60) Provisional application No. 60/690,875, filed on Jun. 16, 2005.

(51) Int. Cl.
*B32B 9/00* (2006.01)
*F04D 29/08* (2006.01)

(52) U.S. Cl. ..................... 428/701; 415/173.1

(58) Field of Classification Search .................. 428/701; 415/173.1
See application file for complete search history.

(56) References Cited

U.S. PATENT DOCUMENTS

| | | | |
|---|---|---|---|
| 5,059,095 A | 10/1991 | Kushner et al. | |
| 5,743,013 A | 4/1998 | Taylor et al. | |
| 6,670,046 B1 | 12/2003 | Xia | |

FOREIGN PATENT DOCUMENTS

| | | |
|---|---|---|
| EP | 1 247 942 A2 | 10/2002 |
| WO | WO 03/014530 A1 | 2/2003 |

OTHER PUBLICATIONS

European Search Report dated Oct. 25, 2006 for European Patent Application No. 06405239.2.

*Primary Examiner*—Gwendolyn Blackwell
(74) *Attorney, Agent, or Firm*—Greenblum & Bernstein, P.L.C.

(57) ABSTRACT

A ceramic abradable material is provided for use for clearance control between turbine blade tips and the shroud or casing in gas turbine engines for industrial and/or aerospace applications. The ceramic abradable material includes an yttria stabilized zirconia (YSZ) that is doped in alumina ($Al_2O_3$). The ceramic abradable in accordance with the invention is a soft abradable material that provides for increased erosion resistance as well as the ability of the turbine blade tips to cut into the abradable without causing them damage. These properties allow for optimum tolerances within the gas turbine engine which results in superior efficiency and performance.

19 Claims, 6 Drawing Sheets

Fig. 4

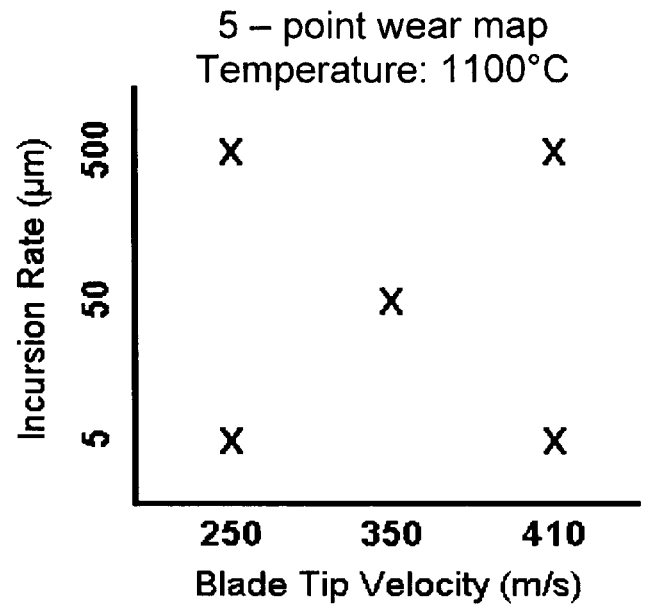

5 – point wear map
Temperature: 1100°C

Fig. 5

| Designation | Description | Function |
|---|---|---|
| SM 2460 | 8 YSZ, Polyester Spray dried product, un-reacted prior to spraying | Standard ceramic abradable |
| XPT 395 | Standard 8 YSZ, spray-dried, HOSP treatment, blended with polyester & hBN and sprayed | Standard ceramic abradable |
| $Al_2O_3$ doped | Standard 8 YSZ with alumina addition, spray dried, HOSP treatment, blended with polyester and sprayed | Alumina: erosion resistance |

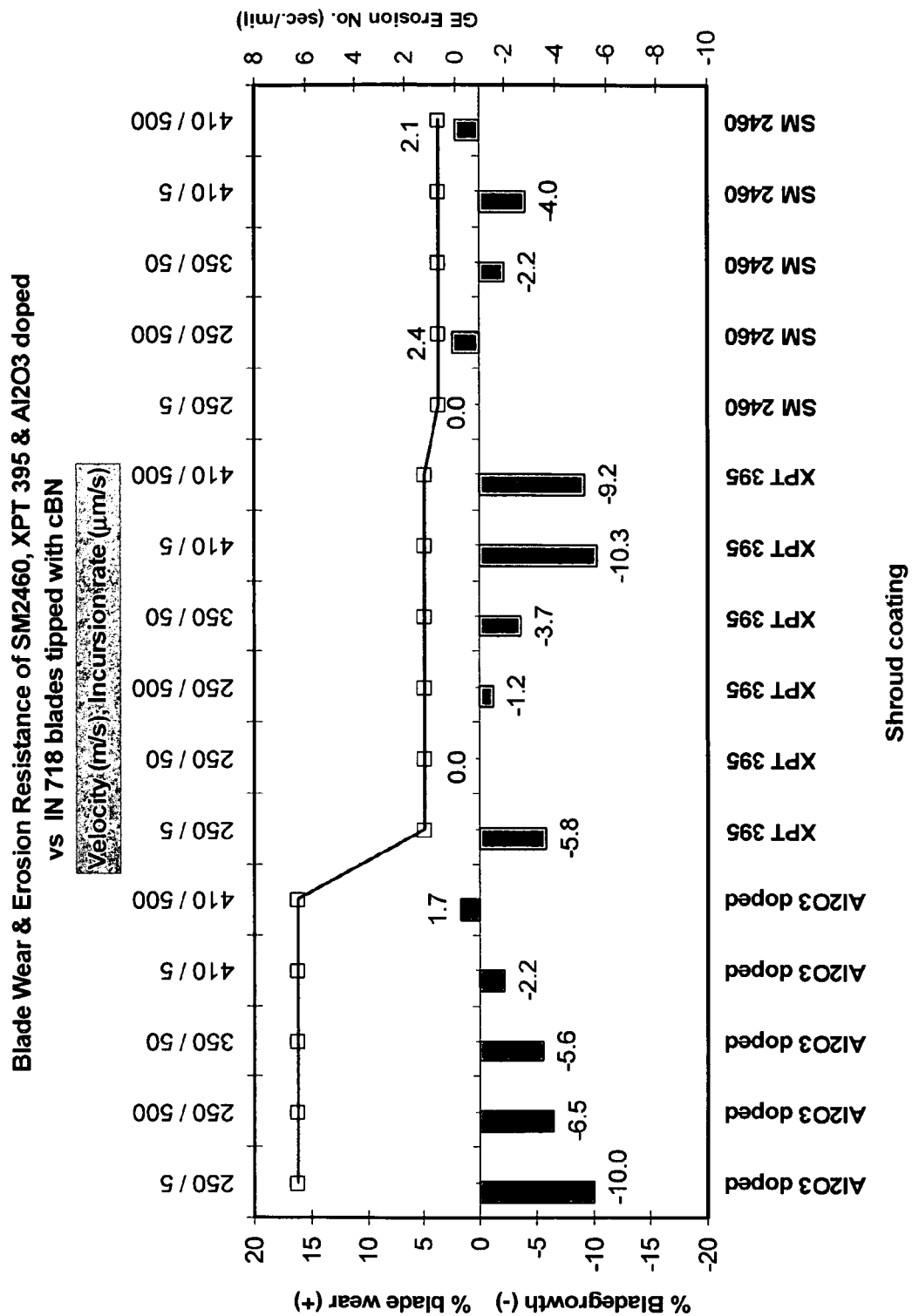

705 Provide a material of yttria stabilized zirconia doped with alumina

710 Mix with a binder, water and defoamants

715 Spray dry process

720 Conduct plasma spherodization

725 Blend spherodized particles with a porosity generator phase

CERAMIC ABRADABLE MATERIAL WITH ALUMINA DOPANT

CROSS REFERENCE TO RELATED APPLICATIONS

This application claims priority under 35 U.S.C. §119(e) from U.S. Provisional Patent Application Nos. 60/690,875, filed on Jun. 16, 2005, which is incorporated in its entirety herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The invention relates to ceramic clearance control (abradable) materials for high temperature applications, and more particularly to a ceramic abradable material that is doped with alumina, whereby the addition of alumina imparts a significant improvement in erosion resistance to the abradable compared to other commercially available ceramic abradables.

2. Description of the Related Art

Gas turbine engines are used in a variety of applications, including aircraft engines and various other industrial applications where operating temperatures may be in the range of 1000-1200 degrees Celsius and higher. A gas turbine engine is an internal-combustion engine that is typically made up of an air compressor, combustion chamber, and turbine wheel that is turned by the expanding products of combustion. It essentially converts the chemical energy of a liquid fuel into mechanical energy by internal combustion. The operational efficiency of gas turbine engines increases with the rise in operational temperatures which can place components under increased stress as well as subject those components to thermal expansion.

In order to maximize efficiency in the operation of turbine engines, it is desirable to minimize the clearances between the turbine blade tips and the outer casing or shroud. Too large a clearance will result in poor fuel efficiency in order to provide the desired operational speeds, while too small of a clearance risks contact between the turbine blade tips and the outer casing which can result in component failure. To solve this problem, conventional gas turbine engines include an abradable coating or seal that is applied to the surface of the outer casing and/or seal. These abradable coatings or seals can be cut by the rotating turbine blades without damaging the turbine blades. In addition, the abradable coatings or seals must remain resistant to erosion that is caused by small solid particles and high gas flow rates present in the turbine. Erosion refers to wear caused by a stream of small particles and is analogous to abrasive wear.

The abradable coating or seal must also have good abradability, spall resistance, low gas permeability, a smooth surface, good aging properties and long term oxidation resistance.

Conventional gas turbine engines may utilize porous ceramic abradable materials, such as yttria stabilized zirconia (YSZ) (8 wt. % $Y_2O_3$, bal. $ZrO_2$). Although such YSZ materials are suited for use as abradable materials, they are relatively friable and susceptible to erosive wear effects. Thus, there is a continued need for superior abradables with acceptable abradability performance and erosion resistance so that tolerances can be optimized even further to achieve improved efficiency and performance.

SUMMARY

Accordingly, the invention is directed to a ceramic abradable material used for clearance control between turbine blade tips and the shroud or casing in gas turbine engines for industrial and/or aerospace applications. The ceramic abradable in accordance with the invention is a soft abradable material that provides for increased erosion resistance as well as the ability of the turbine blade tips to cut into the abradable without causing them damage. These properties allow for optimum tolerances within the gas turbine engine which results in superior efficiency and performance.

The invention provides a ceramic abradable material that includes an yttria stabilized zirconia (YSZ) that is doped in alumina ($Al_2O_3$). In accordance with one embodiment of the invention, about 0.5 to 1 wt. % of alumina is added to a standard yttria stabilized zirconia (e.g., about 8 wt. % $Y_2O_3$, balance $ZrO_2$). The abradable composition in accordance to the invention demonstrates a four- to five-fold improvement in the erosion resistance by solid particles and high gas flow rates as compared to conventional YSZ abradable materials.

In accordance with embodiments of the invention, the invention also provides for the application of the alumina doped yttria stabilized zirconia composition for sealing components in a gas turbine engine. This includes applying the abradable material as a seal between the turbine blades and the casing or shroud housing the gas turbine engine.

Thus, the invention provides a ceramic abradable having superior erosion resistance, abradability, spall resistance, low gas permeability, a smooth surface, good aging properties and long term oxidation resistance.

BRIEF DESCRIPTION OF THE DRAWINGS

The accompanying drawings are included to provide further understanding of the invention and are incorporated in and constitute a part of this specification. The accompanying drawings illustrate embodiments of the invention and together with the description serve to explain the principles of the invention. In the figures:

FIG. 4 illustrates a typical test matrix or "wear map" used for evaluating the abradability performance of ceramic abradable against cBN;

FIG. 5 illustrates a comparison of the composition of the alumina doped ceramic abradable material in accordance with one embodiment of the invention as compared to conventional materials;

FIG. 6 provides a comparison chart of blade wear and erosion resistance for selected abradable seal materials; and FIG. 7 provides a flow chart of a method for forming a powder for abradable coatings according to an embodiment of the invention.

DETAILED DESCRIPTION OF THE INVENTION

Reference will now be made in detail to the preferred embodiments of the present invention, examples of which are illustrated in the accompanying drawings.

Figure 1:
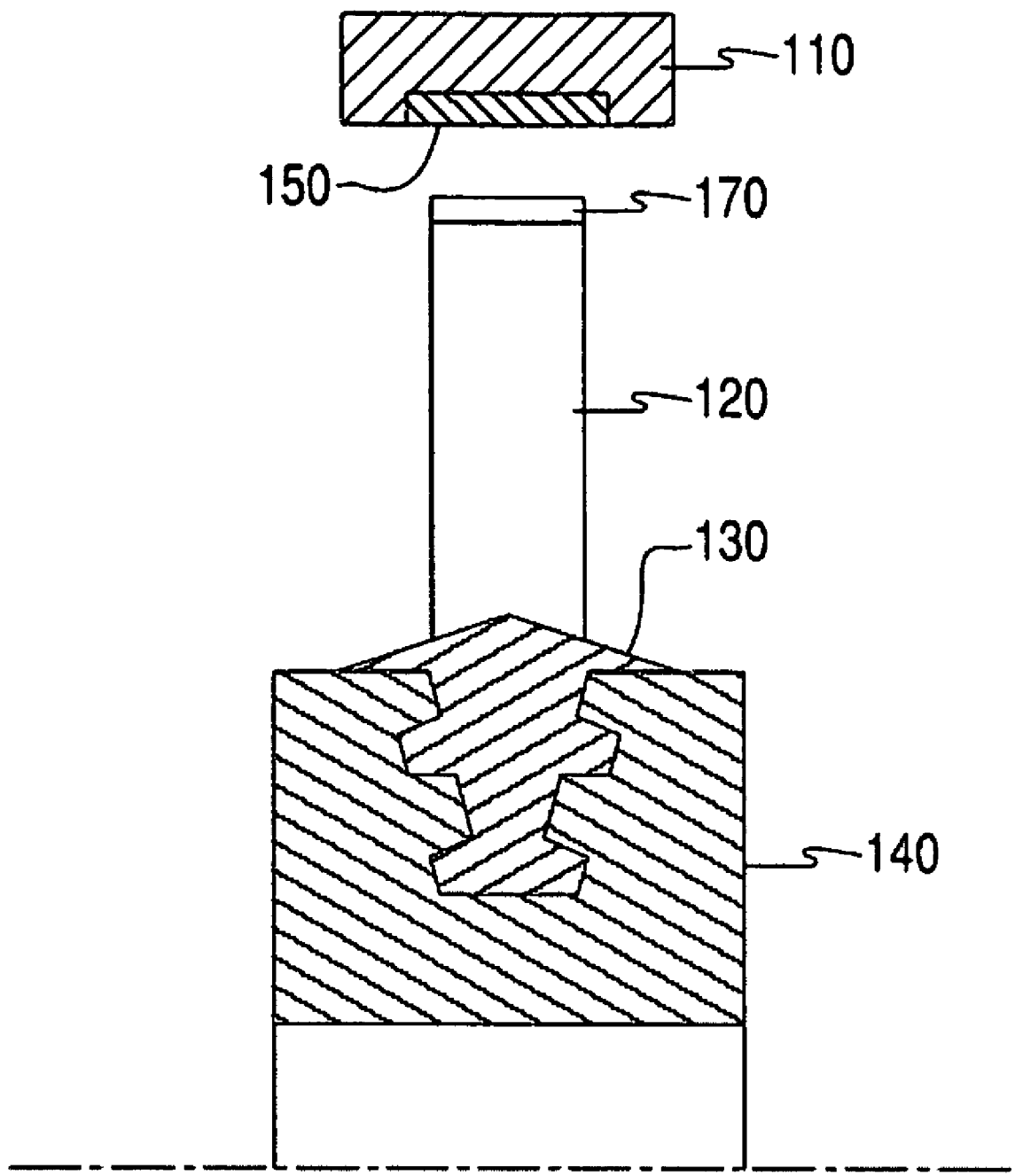
FIG. 1 illustrates a cross sectional view of a section of a gas turbine engine with the abradable material in accordance with the invention.

FIG. 1 illustrates a cross-sectional view of a section of a gas turbine engine. FIG. 1 shows a blade 120 that is affixed to a blade root 130 and disc 140. The disc 140 is driven so as to impart rotational movement to the blade 120. The blade 120 also has an abrasive tip 170 that may be made of an abrasive material, such as cubic boron nitride (cBN) embedded in a creep resistant alloy matrix. FIG. 1 also shows the casing segment 110 or shroud which acts to cover or house the entire gas turbine engine. An abradable seal (material) 150 is provided between the abrasive tip 170 of the blade 120 and the casing segment 110. The abradable seal (material) 150 in accordance with the invention includes yttria stabilized zirconia that is doped with 0.5 to 1 wt. % of alumina. The yttria stabilized zirconia for use in embodiments of the present invention may be generally in the range of about 6-9 wt. % $Y_2O_3$, balance $ZrO_2$. Test results and descriptions below refer to an embodiment using yttria stabilized zirconia having about 8 wt. % $Y_2O_3$ and a balance of $ZrO_2$.

In operation, rotational movement is imparted by the disc 140 to the blade 120. The blade operates at very high rotational speeds and in a high temperature environment. In order to maximize efficiency and performance, the tolerances between the blade 120 and the casing segment 110 are very small and precise. The rotation of the blade 120 causes the abrasive tip 170 to come into repeated contact with the abradable seal 150. The abrasive tip 170 is able to cut into the abradable seal 150 which prevents damage to the blade 120 or to the casing segment 110. The abradable seal 150 in accordance with the invention is also resistant to erosion that may be caused by small solid particles and high gas flow rates.

Figure 2:
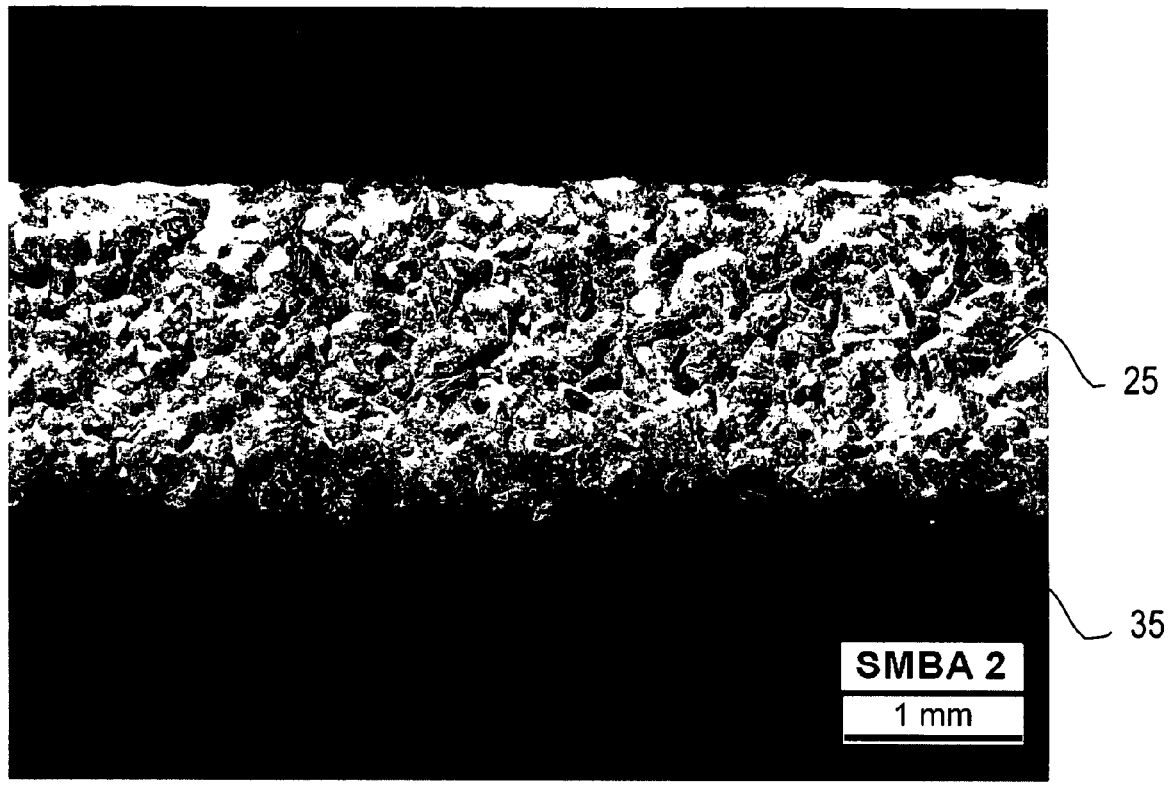
FIG. 2 shows the surface of a blade tip with a protective cubic boron nitride abrasive coating applied to its surface.

FIG. 2 shows the surface of a conventional blade tip 35 that has a conventional protective cubic boron nitride abrasive coating 25 applied to its surface. The abrasive coating 25 material may be, for example, a commercially available cBN material. The blade tip 35 and abrasive coating 25 shown in FIG. 2 have been incursion tested against the alumina doped ceramic abradable according to embodiments of the present invention. Both the blade tip 35 and the coating 25 are shown to have no damage due to contact with a shroud coating made from ceramic abradable material in accordance with an embodiment of the invention.

Figure 3:
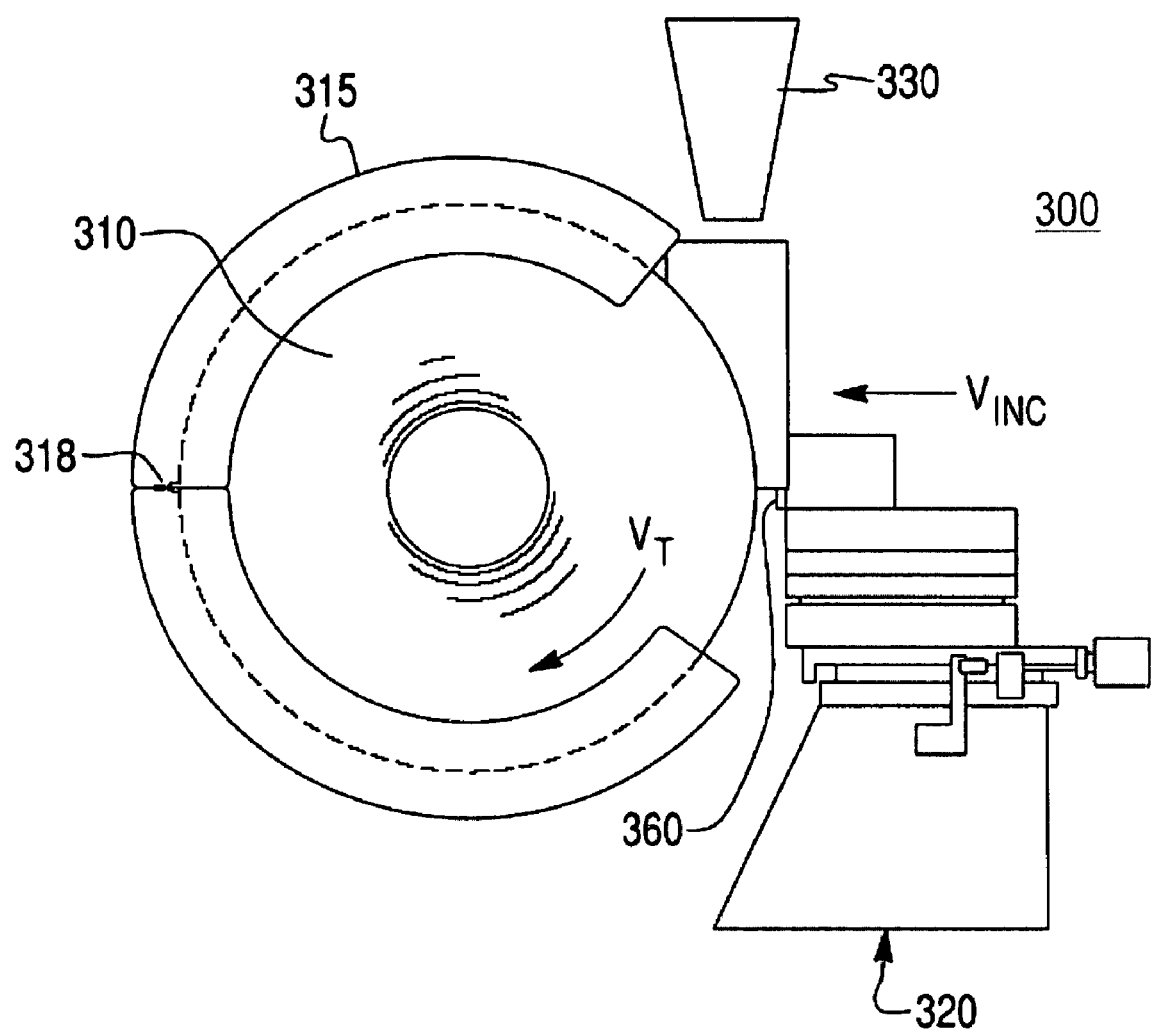
FIG. 3 illustrates a testing facility for testing the ceramic abradable material in accordance with an embodiment of the invention.

FIG. 3 illustrates a testing station 300 for testing the ceramic abradable material in accordance with an embodiment of the invention. In general, the testing station 300 includes a rotor 310, a movable specimen stage 320, and a heating device 330. As shown in FIG. 3, the rotor disc 310 is covered by an insulating casing 315 that allows for re-circulation of hot gases produced by flame combustion of the heating device 330. A blade or knife 318 is provided which is kept in an insulating hot environment for each rotation cycle. The ceramic abradable 360 can be heated up to temperatures of 1200 degrees Celsius and incursion tested against the blade 318 at tip speeds of up to 410 m/s and incursion rates ranging between 2 and 2000 microns per second. The testing station mimics the conditions of a gas turbine engine and the wear on the abradable material 360 can be analyzed.

FIG. 4 illustrates a typical test matrix or "wear map" used for incursion testing of the abradable material at different blade tip velocities and incursion rates in accordance with the invention. The test conditions illustrated on the wear map give an overview of the nominal blade tip incursion conditions that might be typically encountered in an aero or power turbine.

FIG. 5 provides a descriptive a comparison of the abradable material in accordance with embodiments of the invention (designated "$Al_2O_3$ doped" in FIG. 5) as compared with conventional ceramic abradable materials (commercially available materials from Sulzer Metco, SM 2460 and XPT 395). As described earlier, the abradable in accordance with the invention provides for superior erosion resistance, which is discussed further in relation to FIG. 6.

FIG. 6 provides a comparison chart of blade wear and erosion resistance from testing on shroud seals with conventional ceramic abradable materials (SM 2460 and XPT 395) and those with materials in accordance with an embodiment of the invention (designated "$Al_2O_3$ doped" in the figure). Shroud coatings of each material were tested according to the procedures outlined above with respect to FIG. 3 and plotted as shown in FIG. 6. Generally, the data shows that use of material in accordance with embodiments of the invention results in up to a four- to five-fold improvement in the coatings resistance to erosion by solid particles, using a standard erosion test, without compromising abradability. The abradability of each coating is represented by the amount of blade wear experienced after an incursion test. The blade wear is measured as a percentage of the total incursion distance experienced by the blade tip during the test. For the three abradable coatings shown in FIG. 6, the percentage blade wear is either slightly positive where material has been removed from the blade tip, or negative, where material from the ceramic abradable has transferred to the blade tip during the cutting process, thereby "growing" it. In terms of erosion resistance, a GE erosion number greater than 1.0 sec/mil is indicative of acceptable erosion resistance for an engine. Both the standard abradables XPT 395 and SM 2460 exhibit GE erosion values of 1.2 and 0.7 sec/mil respectively. The alumina doped abradable has a considerably better erosion resistance at 6.3 sec/mil which, combined with its comparable abradability, makes for a better performing product compared to the two standard abradables.

Generally, the material according to embodiments of the present invention can be supplied in a number of conventional forms, such as partially stabilized powder form, as an agglomerated powder of the individual constituents, as a slurry of partially stabilized powder, or as a chemical solution. Referring to FIG. 7, a method 700 of forming a powder for abradable coatings is provided. Generally, the abradable composition in accordance with the invention may be manufactured by a conventional spray drying process where, in step 705 the yttria, zirconia and alumina are mixed in accordance with the weight percentages described earlier. In step 710, these materials may be mixed into a mixing tank along with binders, water and defoamants. The resulting mix can be pumped into a tank and fed through a nozzle creating droplets. In step 715, the droplets are sprayed into a high temperature environment which extracts the water, leaving micro-sized particles that agglomerate to form a precursor spray-dried powder in accordance with the invention. In step 720, the abradable powder may then undergo a further spheroidizing (HOSP) process in which the particles are fed through a heavy duty plasma which fuses the material to produce hollow ceramic spherical particles that are a solid solution of the powder precursor constituents.

Prior to application of the abradable material, the HOSP'ed particles may, in step 725, be screened and blended together with a porosity generator phase (e.g., polyester) and then deposited on the shroud seal segment using plasma thermal spray process. The resulting abradable material may be applied using thermal spraying, in compositions similar to those described in related patent application U.S. Pat. Nos.

6,887,530 and 5,530,050. In one embodiment, for example, blended powders may have a component of yttria stabilized zirconia doped with alumina and a component of ceramic coated plastic. The ceramic coated plastic component is made by attrition milling ceramic fine particles with plastic core particles, causing the ceramic fine particles to bind to the surface of the plastic core without the use of a binder. In another embodiment, a component of yttria stabilized zirconia doped with alumina may be combined with a solid lubricant and a matrix forming metal alloy used to form a three-phase abradable seal. Some commercially available ceramic abradables also employ the use of a hexagonal boron nitride "dislocator" phase to assist with particle removal during blade tip incursion into the coating microstructure, e.g., XPT 395. Similar techniques may also be used in aspects of the present invention.

While exemplary embodiments of the invention have been shown and described herein, it will be obvious to those skilled in the art that such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope of the claims, as they will be allowed.

We claim:

1. An abradable ceramic seal material comprising yttria ($Y_2O_3$) stabilized zirconia ($ZrO_2$) doped with alumina ($Al_2O_3$),
   wherein the material is abradable and includes about 0.5 to 1 wt. % alumina.

2. The material in accordance with claim 1, wherein the material includes:
   about 6-9 wt. % yttria; and
   a balance of zirconia, incidental ingredients and impurities.

3. The material in accordance with claim 1, wherein the material includes:
   about 8 wt. % yttria; and
   a balance of zirconia, incidental ingredients and impurities.

4. The material in accordance with claim 1, wherein the material can be supplied in partially stabilized powder form, as an agglomerated powder of the individual constituents, as a slurry of partially stabilized powder, or as a chemical solution.

5. A gas turbine system, comprising:
   at least one turbine blade;
   an abrasive tip affixed on a top surface of the at least one turbine blade;
   a shroud housing the at least one turbine blade; and
   an abradable seal arranged on the shroud between the at least one turbine blade and the shroud,
   wherein the abradable seal includes yttria stabilized zirconia that is doped with 0.5 to 1 wt. % of alumina.

6. The gas turbine system of claim 5, wherein the yttria stabilized zirconia includes:
   about 6-9 wt. % yttria; and
   a balance of zirconia, incidental ingredients and impurities.

7. The gas turbine system of claim 5, wherein the yttria stabilized zirconia includes:
   about 8 wt. % yttria; and
   a balance of zirconia, incidental ingredients and impurities.

8. An abradable ceramic seal material arranged on a turbine shroud and comprising:
   yttria ($Y_2O_3$) stabilized zirconia ($ZrO_2$) doped with alumina ($Al_2O_3$),
   wherein the material is abradable and includes about 0.5 to 1 wt. % alumina.

9. The material of claim 8, wherein the material includes:
   about 6-9 wt. % yttria; and
   a balance of zirconia, incidental ingredients and impurities.

10. The material of claim 8, wherein the material includes:
    about 8 wt. % yttria; and
    a balance of zirconia, incidental ingredients and impurities.

11. The material of claim 8, wherein the material is supplyable one of:
    in partially stabilized powder form;
    as an agglomerated powder of the individual constituents;
    as a slurry of partially stabilized powder; and
    as a chemical solution.

12. A turbine shroud comprising:
    an abradable ceramic seal material arranged on the turbine shroud and comprising yttria ($Y_2O_3$) stabilized zirconia ($ZrO_2$) doped with alumina ($Al_2O_3$),
    wherein the material is abradable and includes about 0.5 to 1 wt. % alumina.

13. The turbine shroud of claim 12, wherein the material includes:
    about 6-9 wt. % yttria; and
    a balance of zirconia, incidental ingredients and impurities.

14. The turbine shroud of claim 12, wherein the material includes:
    about 8 wt. % yttria; and
    a balance of zirconia, incidental ingredients and impurities.

15. The turbine shroud of claim 12, wherein the material is supplyable one of:
    in partially stabilized powder form;
    as an agglomerated powder of the individual constituents;
    as a slurry of partially stabilized powder; and
    as a chemical solution.

16. A method of making the abradable material of claim 1, the method comprising:
    providing a material of yttria stabilized zirconia with 0.5 to 1 wt. % of alumina;
    mixing the material with a binder, water and defoamants to form a mixture; and
    spraying droplets of the mixture at a high temperature sufficient to extract the water and form micro-sized particles.

17. The method of claim 16, further comprising exposing said particles to a plasma spherodizing process to produce hollow ceramic spherical particles.

18. The method of claim 17, further comprising blending the particles with a porosity generator phase.

19. A method of applying the abradable seal material of claim 1 on a shroud, the method comprising:
    blending a porosity generating material with ceramic spherical particles that are a solid solution of yttria stabilized zirconia with 0.5 to 1 wt. % of alumina; and
    applying the blended material on a shroud seal segment using a plasma thermal spray process.

* * * * *